Feb. 9, 1932.　　　M. KIFORSKY　　　1,844,167
GROUND SCRAPER AND LEVELER
Filed Feb. 4, 1931　　3 Sheets-Sheet 1

Inventor
Mike Kiforsky.
By
Attorney

Feb. 9, 1932. M. KIFORSKY 1,844,167
GROUND SCRAPER AND LEVELER
Filed Feb. 4, 1931 3 Sheets-Sheet 2
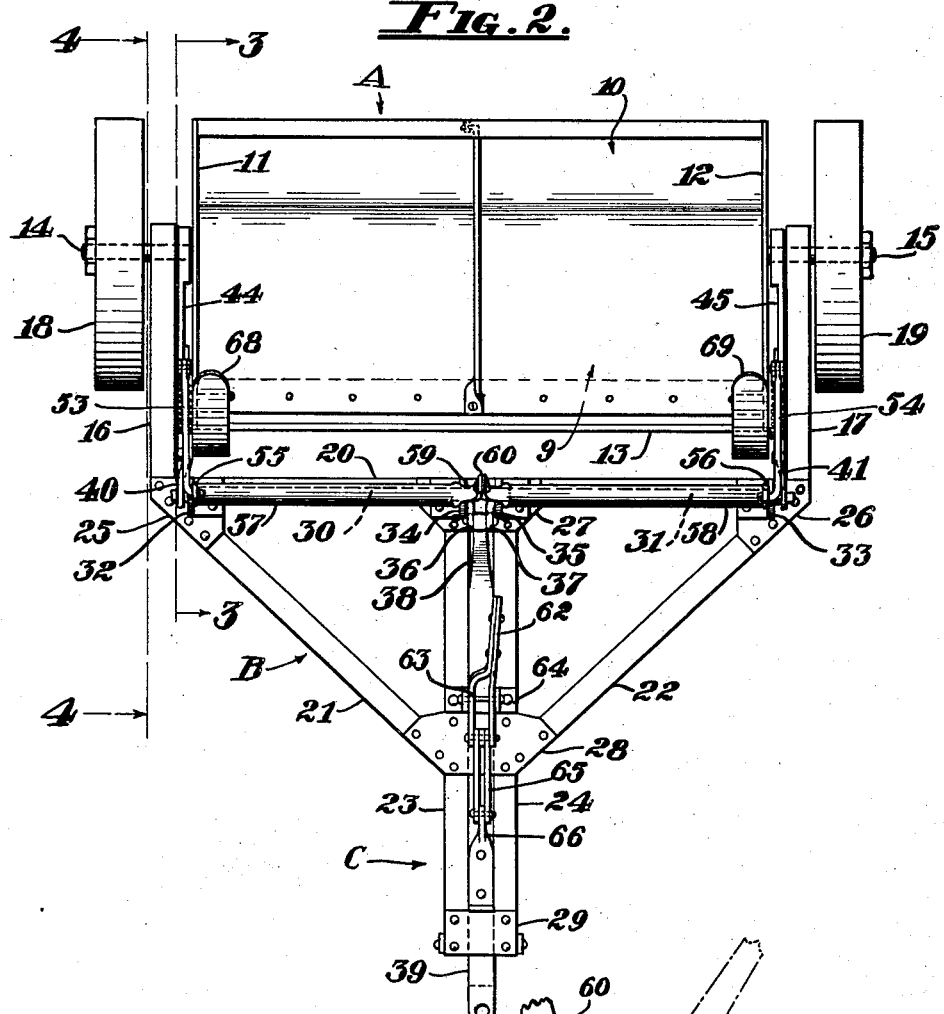
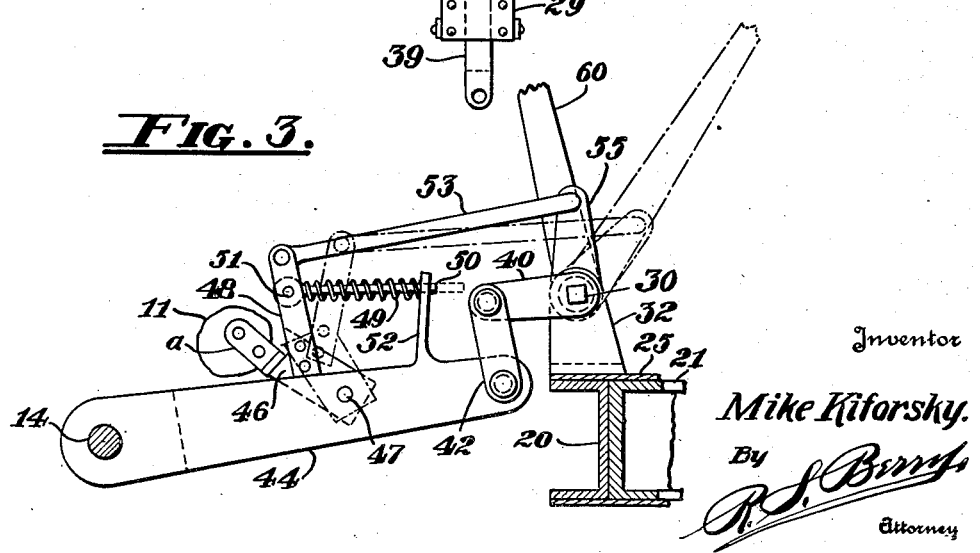
Inventor
Mike Kiforsky.
By
Attorney Feb. 9, 1932. M. KIFORSKY 1,844,167
GROUND SCRAPER AND LEVELER
Filed Feb. 4, 1931 3 Sheets-Sheet 3
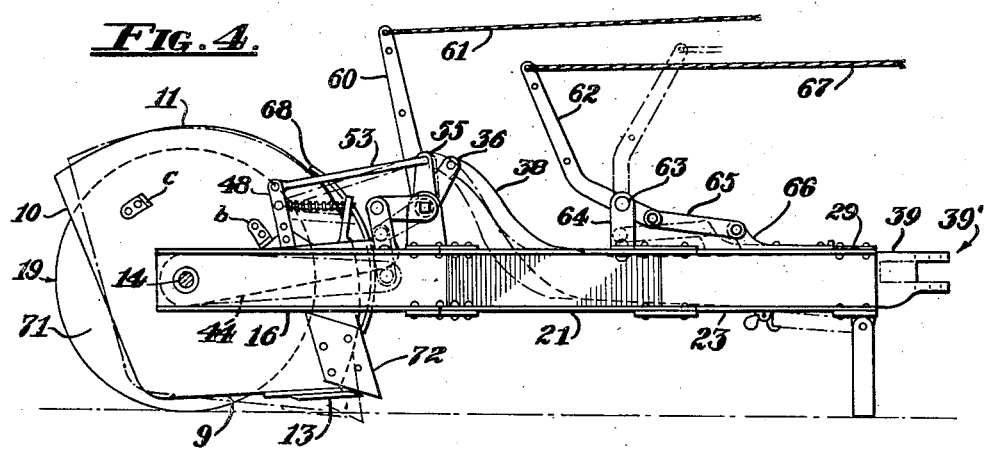
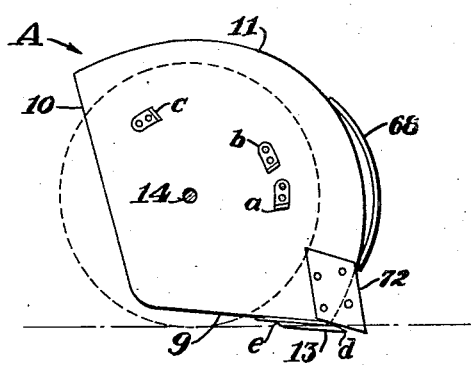
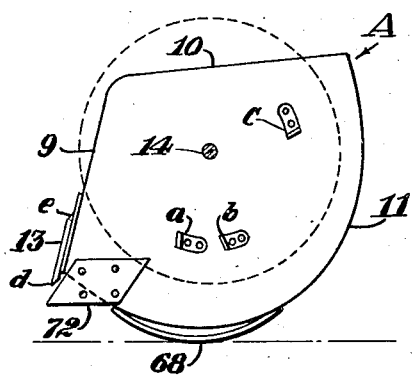
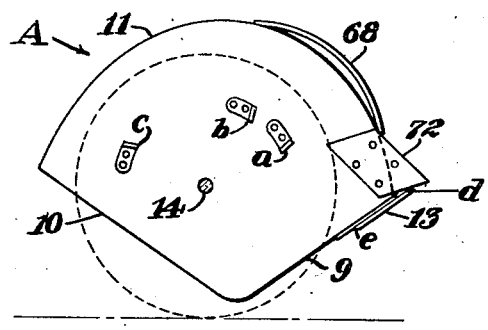
Inventor
Mike Kiforsky.
By
Attorney Patented Feb. 9, 1932

1,844,167

UNITED STATES PATENT OFFICE

MIKE KIFORSKY, OF LOS ANGELES, CALIFORNIA

GROUND SCRAPER AND LEVELER

Application filed February 4, 1931. Serial No. 513,290.

This invention relates to a ground scraping and leveling machine of the shovel type, and has as its primary object the provision of an implement which is operable while being advanced over the ground surface to scrape and remove the surface material, to collect and convey the removed materials, to dump the accumulated load of materials, to effect a leveling action, and to be restored to a normal position.

Another object is to provide a mechanism of the above character in which the several operations may be manually controlled by an operator located at a remote point in advance of the implement, whereby it is adapted to be towed over the ground surface by means of a motor vehicle, such as a tractor, and be controlled entirely by an operator on the vehicle.

Another object is to provide a means whereby the several operations of the implement may be controlled by pull cords.

Another object is to provide a manually controlled trip mechanism whereby the scraper may be caused to tilt to effect discharge of its contents, together with means for supporting and maintaining the scraper in its tilted position so that it will then serve as a leveler.

Another object is to provide a ground scraper and leveler of sturdy construction and in which the operative parts are so arranged as to be convenient of access for the purposes of making replacements and repairs.

With the foregoing objects in view together with such other objects and advantages as may subsequently appear, the invention resides in the parts and in the combination, construction and arrangement of parts hereinafter described and claimed and illustrated by way of example in the accompanying drawings in which:

Figure 2 is a plan view of the machine;

Figure 3 is a detail in section and elevation as seen on the line 3—3 of Figure 2 with the scraper body removed illustrating the construction and operation of the trip mechanism;

Figure 4 is a view in side elevation as seen on the line 4—4 of Figure 2 showing in full lines the scraper as disposed in a normal position and in broken lines as disposed in a scraping position;

Figure 5 is a diagram illustrating the scraper body as disposed in a scraping position;

Figure 6 is a diagram illustrating the scraper body as disposed in its dumped and leveling position;

Figure 7 is a diagram illustrating the scraper body as disposed in a conveying position.

Figure 1:
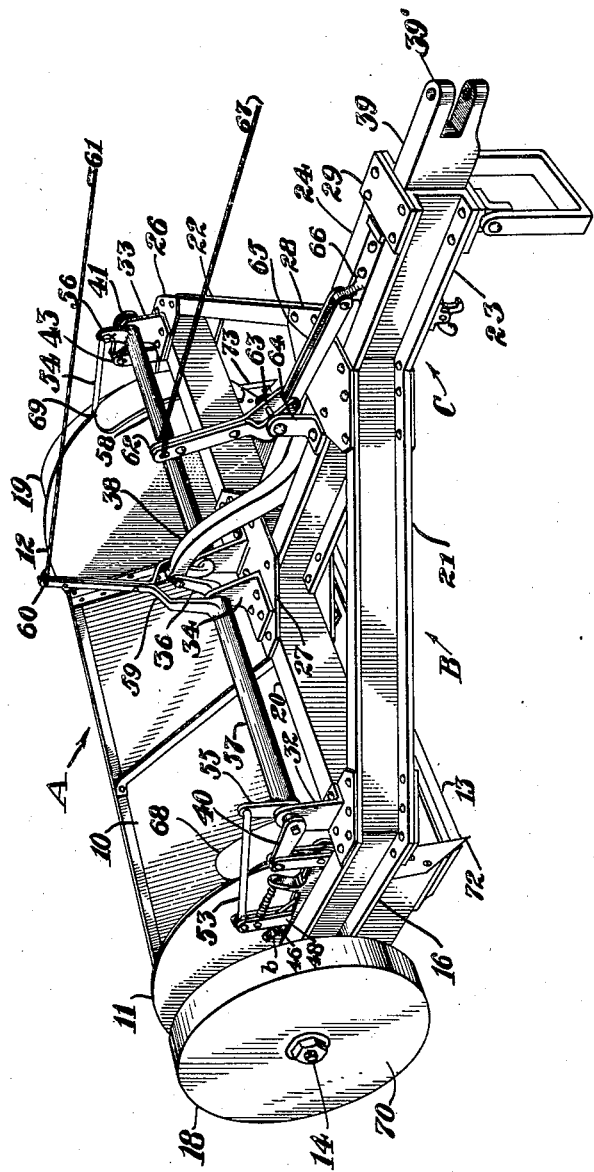
Figure 1 is a perspective view of the machine as seen from the front thereof and showing the parts in a normal position.

Referring to the drawings more specifically, A indicates generally the scraper body which comprises a bottom wall 9, a back wall 10 formed in continuation of the bottom wall, end walls 11 and 12 and a scraper blade 13 extending along the forward edge of the bottom wall. Mounted on the end walls 11 and 12 in axial alignment are outwardly extending trunnions 14 and 15 which project through and are journalled in the side members 16 and 17 of a yoke B and the outer end portions of which trunnions constitute axles on which supporting wheels 18 and 19 are revolvably mounted; the wheels being revoluble relatively to each other. The trunnions are arranged eccentric to the longitudinally extending center of gravity of the scraper body A. The yoke B embodies a beam 20 which connects the side members 16 and 17 forward of the scraper body A and further includes inwardly leading diagonal members 21 and 22 which are connected to the opposite sides of a tongue C embodying a pair of spaced, parallel members 23 and 24 which lead from the beam 20 and are rigidly connected thereto. The members of the yoke B and of the tongue C are preferably formed of channel iron as here shown.

The ends of the beam 20 are connected to the yoke member 16—21 and 17—22 by gusset plates 25 and 26 and to the tongue members 23 and 24 by gusset plates 27, and the yoke members 21 and 22 are connected to the tongue members 23 and 24 by gusset plates 28, while the tongue members 23 and 24 are connected together in spaced relation to each other by the gusset plates 27 and 28 and also by gusset plates 29 connecting the outer end portions thereof which project forwardly of the yoke B.

Mounted on the yoke B and extending above the beam 20 parallel thereto is a pair of aligned rock-shafts 30 and 31 the outer ends of which are supported on standards 32 and 33 carried on the gusset plates 25 and 26 and the inner ends of which are supported on a pair of spaced standards 34 and 35 erected from the gusset plate 27. The inner ends of the rock-shafts 30 and 31 are formed with cranks 36 and 37 which connect with a goose neck 38 formed on the inner end of a slide bar 39 mounted for longitudinal reciprocal movement between the side members 23 and 24 of the tongue C, and the forward end of which slide bar is formed with a yoke 39' for connection with the draw bar of a tractor or other means for pulling the scraper. The outer ends of the shafts 30 and 31 extend through the standards 32 and 33 and are fitted with yokes 40 and 41 projecting rearwardly therefrom and are connected by downwardly extending links 42 and 43 to the forward ends of horizontally extending rocker arms 44 and 45 pivotally connected to the trunnions 14 and 15 between the side members 16 and 17 of the yoke B and the end walls 11 and 12 of the scraper body A.

Each of the arms 44 and 45 has pivoted thereon a catch 46 which catch comprises a flat plate positioned to extend upwardly at a rearward inclination from the arm and secured thereto by a pivot pin 47, as shown in Figure 3, for vertical rocking movement.

Rigidly affixed to the outer end portion of the plate 46 and projecting upwardly therefrom is a pair of spaced parallel bars 48 the upper portions of which constitute a yoke and the lower end portions of which constitute abutments which are adapted to seat on the upper margin of the arm 44 or 45 to limit downward swinging movement of the catch 46, and which latter is normally maintained in its lowermost position by a spring 49 wound around a pin 50 pivotally connected at 51 to the bars 48 and slidably extending through an upstanding lug 52 formed on the arm forward of the bars 48. The outer upper end of the catch 46 is inclined to the vertical and constitutes an abutment against which any one of a series of spaced stops a, b and c carried on the outer faces of the end walls 11 and 12 of the scraper are adapted to abut, the stops being disposed on an arc concentric with the axes of the trunnions.

The upper ends of the bars 48 are pivotally connected to links 53 and 54 which lead forwardly and connect with upstanding cranks 55 and 56 formed on the outer ends of a pair of tubular rock-shafts 57 and 58 turnably mounted on the rock-shafts 30 and 31 and extending between the standards supporting the latter. The inner ends of the tubular rock-shafts 57 and 58 are connected together by a yoke 59 formed on the lower end of an upstanding lever 60 to which it attached a line 61 which leads forwardly to a point convenient to the reach of an operator. A lever 62 is pivoted at 63 on standard 64 erected from the tongue C at a point spaced forwardly from the beam 20 the lower end of which lever is pivotally connected to links 65 which lead forwardly and are pivoted at their forward ends to an upstanding lug 66 projected upwardly from the upper face of the slide bar 39. A line 67 is attached to the upper end portion of the lever 62 and leads forwardly to a point convenient to the reach of the operator.

The margins of the scraper end walls 11 and 12 are formed on arcs of greater radius than the circumference of the wheels 18 and 19 and which arcs are struck from centers eccentric to the axes of the wheels, and mounted to project over the marginal portions of the end walls contiguous the bottom wall 9 of the scraper body are sled runners 68 and 69 adapted to slide on the ground and to afford a support for the scraper body when the latter is inverted as shown in Figure 6 in which position the wheels 18 and 19 will be spaced clear of the ground.

As a means for preventing the accumulation of dirt within the wheels 18 and 19 their outer and inner faces are formed of smooth disks 70 and 71 which extend between the hubs and rims of the wheels.

The scraper blade 13 is demountably secured to the under side of the scraper bottom wall 9 in a usual manner and is formed with knife edges d and e on its forward and rearward margins to provide double cutting edges whereby when one of the edges becomes excessively worn or dull the blade may be reversed to present the other edge forwardmost.

As a means for protecting the marginal portions of the scraper end walls against wear contiguous the ends of the blade 13 said end walls are fitted with demountable and renewable plow plates 72 and 73 having cutting edges which project forwardly beyond the margins of the end walls so as to penetrate the soil in advance of the cutting edge of the scraper blade 13 as indicated in broken lines in Figure 4.

In the operation of the invention, when it is desired to haul the scraper without performing a scraping action the scraper body is positioned with the stops a thereon abutting against the catches 46 which will then dispose the scraper body as shown in Figure 7, that is, with the scraper blade 13 elevated from the ground a considerable distance and in which position the scraper body may be utilized as a conveyer for such articles or materials as may be deposited therein. When it is desired to dispose the scraper body in a position to effect a scraping action, the operator, by pulling the cord 61 to rock the lever 60 forwardly will thereby cause the rock-shafts 57 and 58 to turn a partial revolution and thereby act through the cranks 55 and 56, links 53 and 54 and bars 48 in opposition to the spring 49 out of engagement with the stops $a$ thereby permitting the forward portion of the scraper body to gravitate downwardly under the action of the weight thereof afforded by reason of this portion being eccentric to the pivotal mounting of the scraper on its trunnions. If the operator desires to dispose the cutting edge of the scraper contiguous the ground surface but not in engagement therewith the pull on the line 61 will be released immediately on effecting disengagement of the catch 46 from the stops $a$ so as to allow the spring 49 to restore the catch 46 to its normal position which will be in the path of travel of the stops $b$ so that the latter will move into contact with the inclined ends of the catches 46 thereby bringing the scraper body to rest in the position shown in full lines in Figure 4, that is, with the cutting edge of the scraper inclined upwardly proximate the ground surface.

When it is desired to effect a scraping and scooping action the lever 62 is rocked forwardly as by exerting a pull on the line 67 thereby causing a relative longitudinal movement between the tongue C and the slide bar 39 in effect causing the slide bar 39 to move rearwardly but actually hauling the tongue C and the scraper forwardly which movement effects a rearward rocking movement of the cranks 36 and 37 thereby turning the rock-shafts 30 and 31 so as to cause the cranks 40 and 41 to move downwardly and thereby permit the arms 44 and 45 to swing downwardly under the load of the forwardmost portion of the scraper body which is then supported on the arms 44 and 45 by reason of the stops $b$ then being engaged by the catches 46. The blade 13 is thus lowered, into engagement with the soil to effect a scraping and scooping action thereon; the depth of the cut or penetration of the blade 13 being determined by the extent of the movement of the lever 62 within its limits. On the desired amount of material being scooped into the scraper, the operator releases the lever 62 whereupon the pull on the slide bar 39 by the draft appliance to which it is connected causes relative forward movement of the slide bar and rearward movement of the tongue C thereby causing the cranks 36 and 37 to swing forwardly to turn the rock-shafts 30 and 31 so as to swing the cranks 40 and 41 upwardly and thereby elevate the arms 44 and 45 so as to act through the catches 46 and the stops $b$ to lift the forward edge of the scraper body A into the position shown in full lines in Figure 4. The load on the scraper may then be hauled forwardly to a desired point whereupon to effect dumping thereof the operator actuates the lever 60 as before described to move the catches 46 out of the engagement with the stop $b$ whereupon the load on the forward portion of the scraper will cause the latter to swing downwardly so as to impale the plows 72 and 73 in the ground so that these plows will then act as pivots upon which the scraper body will be swung upwardly and over by the pull imparted thereto through the trunnions 14 and 15 on the tongue C being advanced thereby causing the scraper body to invert and to come to rest in its inverted position when the stops $c$ engage the catches 46.

The scraper body will then ride on the runners 68 and 69 in the position shown in Figure 6 and in which position the blade 13 will then serve as a leveler.

When it is desired to restore the scraper body to the position shown in Figure 7, the catches 46 are disengaged from the stops $b$ by operation of the lever 60 as before described whereupon the pull directed to the trunnions 14 and 15 through the tongue C will cause the scraper body to turn on the arcuate margins of its end walls 11 and 12 until the wheels 18 and 19 are brought into contact with the ground whereupon the forward portion of the scraper body will gravitate downwardly to rest in the position shown in Figure 7 or in Figure 4 according to whether the stops $a$ or $b$ are allowed to engage the catches 46; the stops $a$ engaging the catches 46 if the latter are in their normal position which occurs on release of the lever 60.

I claim:

1. A ground scraper and leveler comprising a scraper body including a bottom wall, a back wall, and end walls; trunnions projecting eccentrically of the end walls, a yoke in which said trunnions are revolubly mounted, wheels mounted on said trunnions, a tongue connected to said yoke, a slide bar longitudinally slidable relatively to said tongue, arms pivotally connected to said trunnions, a pair of aligned rock-shafts, cranks connecting the inner ends of said rock-shafts to said draw bar, crank and link connections between the outer ends of said rock-shafts and said arms, catches on said arms, a series of stops on the end walls of said scraper body arranged to be successively engaged by said catches, a pair of operating levers, a connection between one of said levers and said catches for effecting positioning of said catches out of operative relation to said stops, and connections between the other of said operating levers and said slide bar whereby the slide bar may be moved relative to the tongue to thereby tilt the scraper.

2. In a ground scraper and leveler, a scraper body having end walls, aligned trunnions projecting outwardly from said end walls eccentric to the center of gravity of said scraper body, ground engaging wheels revolubly mounted on said trunnions relatively to which said scraper body is turnable around the axes of said trunnions, a slide bar, a connection between said slide bar and said trunnions relatively to which said slide bar is longitudinally movable, an arm pivotally connected to each of said trunnions, a connection between said arms and said slide bar for effecting swinging movement of said arms on longitudinal movement of said slide bar relatively to its connection with said trunnions, stops on said scraper body, and means on said arms engageable with said stops for holding said scraper body against turning on said trunnions relatively to said arms whereby swinging of said arms will effect corresponding movement of said scraper body.

3. The structure called for in claim 2 including manually operable means for effecting at will disconnection of said arms and stops.

4. In a ground scraper and leveler, a scraper body, a pair of wheels for supporting said body, trunnions connecting said body and wheels eccentrically of said body, a yoke through the side members of which said trunnions extend, a tongue on said yoke, a slide bar slidably supported on said tongue, an arm pivoted on each of said trunnions, a trip mechanism affording a connection between said arms and said scraper body, manually controlled means for effecting relatively longitudinal movement between said tongue and slide bar, and means connecting said arms and said slide bar co-operable with said last named means to effect tilting of said scraper body relatively to said wheels.

MIKE KIFORSKY.